Nov. 6, 1923.

A. SEGUIN 1,472,942

CALCULATING MACHINE

Filed Oct. 5, 1922

Augustin Seguin
INVENTOR;
By Otto Munk
his Attorney.

Nov. 6, 1923.
A. SEGUIN
CALCULATING MACHINE
Filed Oct. 5, 1922
1,472,942
3 Sheets-Sheet 2
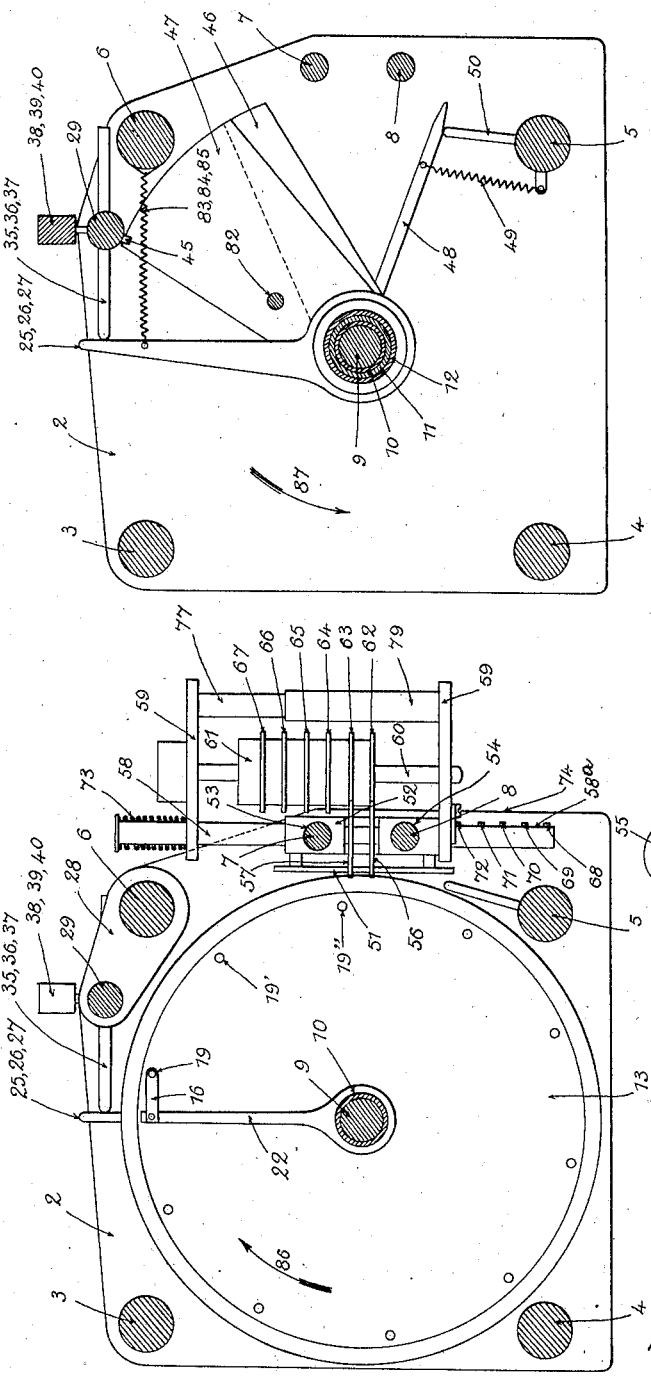
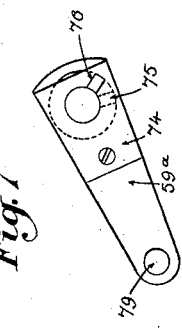
Augustin Seguin
INVENTOR;
By Otto Munk
his Attorney Nov. 6, 1923.

A. SEGUIN 1,472,942

CALCULATING MACHINE

Filed Oct. 5, 1922

Augustin Seguin
INVENTOR:

By Otto Munk
his Attorney

Patented Nov. 6, 1923.

1,472,942

UNITED STATES PATENT OFFICE.

AUGUSTIN SEGUIN, OF PARIS, FRANCE.

CALCULATING MACHINE.

Application filed October 5, 1922. Serial No. 592,477.

*To all whom it may concern:*

Be it known that I, AUGUSTIN SEGUIN, citizen of the French Republic, residing at Paris, in the Republic of France, have invented new and useful Improvements in Calculating Machines, of which the following is a specification.

This invention has for its object a calculating machine whereby multiplication and all the operations derived therefrom such as division, powers, roots and the like, as well as addition and subtraction, may be performed by mechanical means.

In the accompanying drawings which are given by way of example:

Fig. 2 is a cross section of the same on the line A—A of Fig. 1.

Fig. 3 is a second cross section on the line B—B of Fig. 1.

Fig. 6 is a plan view of the carriage and the frame carrying the totalizing counter.

Fig. 7 is an inverted plan view of the lower part of the escapement of the carriage.

Figure 1:
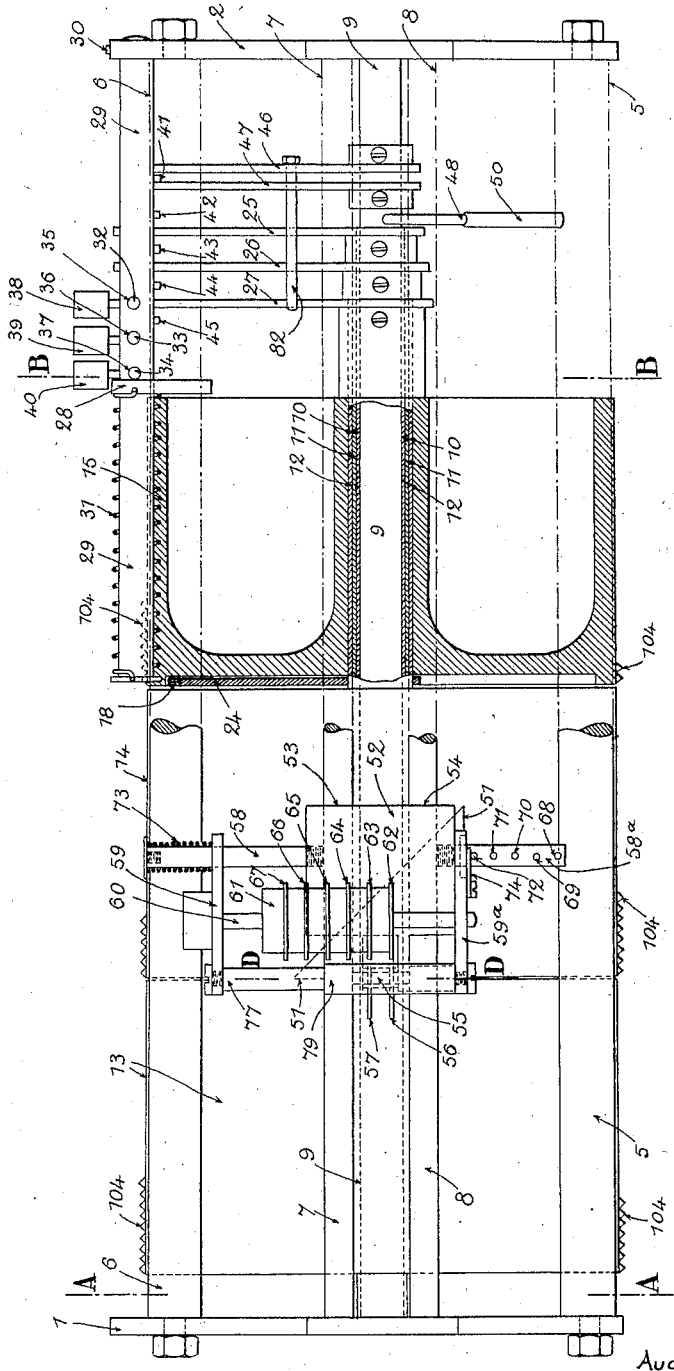
Fig. 1 is an elevation view, partly in section, of a calculating machine constructed according to the invention.

Before proceeding with a detailed description of the machine, it may be remarked that its operation is based upon the following method of effecting a multiplication.

Let it be desired for example to find the product $$327 \times 146 = 47742.$$

One of the factors is reversed, for instance 146, by writing 641, and the two numbers are superposed as follows, by successively displacing the multiplier to the left by one figure:

$$\begin{array}{ccccc} 327 & 327 & 327 & 327 & 327 \\ 641 & 641 & 641 & 641 & 641 \end{array}$$

For each position, the superposed figures are multiplied, and the products are added:

The following terms are obtained:

$$\begin{array}{ccccc} 7\times6 & (6\times2)+(7\times4) & (3\times6)+(2\times4)+(7\times1) & (3\times4)+(2\times1) & 3\times1 \\ \text{or} & & & & \\ 42 & 40 & 33 & 14 & 3 \end{array}$$

Each of these terms commencing at the right will represent in its position a term of the product sought for: 3 ten-thousands, 14 thousands, 33 hundreds, 40 tens, 42 units, and the whole of these terms represents the final product after the tenths have been carried over from one term to another where required.

It should be observed that the operation might also be performed in the contrary sense by displacing the multiplier from left to right and this will give in the first place the term occupying the highest position:

$$3 \quad 14 \quad 33 \quad 40 \quad 42$$

The following description shows the mechanical method of effecting these operations. In the form of construction given by way of example, and relating to a machine adapted to multiply a number consisting of three figures at the maximum by a number also consisting of three figures at the maximum, the machine comprises three horizontal drums 13, 14, 15 (Fig. 1) whose periphery is divided into longitudinal sectors numbered from 0 to 9 which can be turned individually so as to bring the desired sector opposite a reference mark. For example, in the case considered above, one brings opposite the mark the sector 1 of the left-hand drum 13, the sector 4 of the intermediate drum 14 and the sector 6 of the right-hand drum 15. In this manner the number 146 is formed on the drums. The machine also comprises three graduated horizontal contact rods 37, 36, 35 which may be moved to greater or lesser extent through a longitudinal rod 29. In the present example, the rod 37 will be inserted as far as the division corresponding to the figure 3, the rod 36 as far as figure 2 and the rod 35 as far as figure 7. This will form the number 327 upon the contact rods. It is then simply necessary to move five times along the drums a totalizing device disposed on a carriage 52 in order that the totalizing device shall indicate the desired product. The movements of said totalizing device towards the left, Fig. 1, will successively effect the elementary multiplications as above indicated, so that the carriage will have to be moved five times forward and back along the drums. It would be moved forward and back seven times in the case of a machine intended for numbers of four figures.

The main frame of the apparatus consists of two vertical cheeks 1, 2 connected together by horizontal cross-pieces 3, 4, 5, 6, 7, 8. In the said cheeks is journalled a horizontal shaft 9 having loosely mounted thereon three coaxial sleeves or tubes 10, 11, 12. Upon said tubes are mounted respectively the multiplying cylinders or drums 13, 14, 15, whereof the details will be given below. Each cylinder or multiplier or "product indicator" is connected to the tube on which it is mounted, through the intermediary of small spring strips 16 (Fig. 2) provided at the ends with small studs adapted to enter holes 19, 19', 19'' equally spaced in the end of each cylinder and ten in number for each cylinder, the said strips being mounted on entraining arms 22 secured to the corresponding tubes. Each tube 10, 11, 12 carries at the other end a radial arm 25, 26, 27 attached thereto, whose angular position on the tube can be regulated for example by a set screw.

Figure 4:
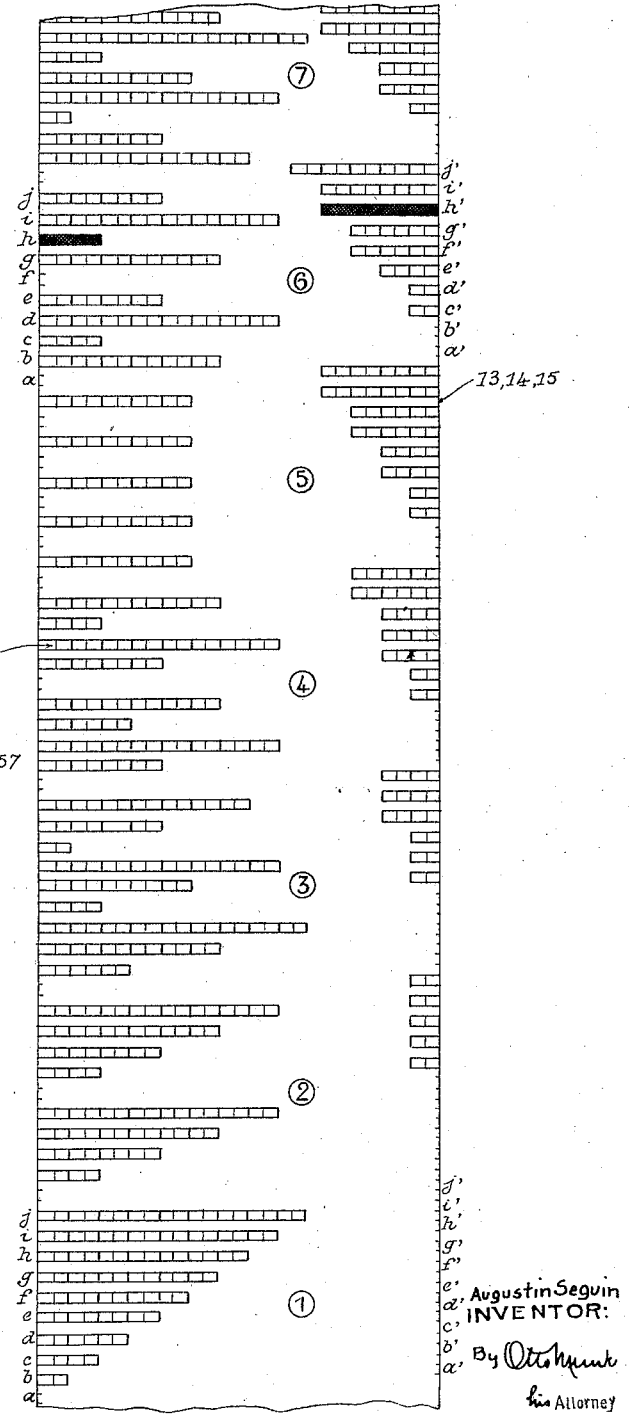
Fig. 4 is a partial diagrammatic development of the periphery of one of the drums.

The periphery of each multiplying cylinder 13, 14, 15 is divided into ten sectors which are colored and are numbered from 0 to 9, as observed in Fig. 4, which shows diagrammatically a portion of the periphery of a cylinder spread out. Each sector has twenty racks which are parallel to its generatrices and whose positions for sector No. 1 are indicated by the letters a to j and a' to j' (Fig. 4). The racks a to j of sector No. 1 which start from the left-hand edge of the cylinder (Fig. 4) have a number of teeth equal to the figure for the number of units of the product of 1 by the number from 0 to 9. The racks a to j of sector No. 2 have a number of teeth equal to the figure for the number of units of the product of 2 by the numbers 0 to 9, etc. For example, the racks a to j of sector No. 6 have respectively 0, 6, 2, 8, 4, 0, 6, 2, 8, 4, teeth, which numbers correspond to the last figure of the products 0, 6, 12, 18, 24, 30, 36, 42, 48, 54. The racks a' to j' of sector 1, which start from the right hand edge of the cylinder (Fig. 4), have a number of teeth equal to the tens figure of the product of 1 by the numbers from 0 to 9 (so that in reality these racks have zero teeth). The racks a' to j' of sector 2 have a number of teeth equal to the tens figure of the product of 2 by the numbers from 0 to 9, etc. For example, the racks a' to j' of sector No. 6 have, 0, 0, 1, 1, 2, 3, 3, 4, 4, 5 teeth, which numbers correspond to the tens figure of the products 0, 6, 12, 18, 24, 30, 36, 42, 48, 54.

For reasons of construction, as will be further stated, the corresponding racks such as a, a' are not in alignment, but are spaced on the circumference by an interval corresponding to the thickness of two racks, as is clearly shown on the racks h h' which have been cross-hatched in sector No. 6 (Fig. 4).

Upon the main frame is slidable a horizontal rod or shaft 29 (Fig. 1) guided at the ends in the cheek 2 and in a small support 28 (Fig. 2) secured to the cross-piece 6. A screw 30 screwed in the cheek 2 and entering a lengthwise slot in the axle 29 prevents the latter from turning. A spring 31 operating in the sense of traction is attached at one end to the support 28 and at the other at the end of shaft 29 to a plug mounted loosely at the end of said shaft and tends to draw the shaft 29 constantly to the right (Fig. 1).

In the shaft 29 are three holes 32, 33, 34 drilled at right angles to the axis of the shaft, wherein can be caused to slide three rods or stop-pieces 35, 36, 37. Each rod can thus be inserted more or less through the shaft 29 and may occupy ten different positions. Each rod is held in the position assumed, by a set screw, pin, spring or like member 38, 39, 40. These rods are graduated from 0 to 9 or move before a graduated ruler.

To "inscribe" on the machine, by means of said contact rods, the first factor of the product sought, or 327 in the above-mentioned example, one will push in the rod 37 as far as the figure 3 of the scale, the rod 36 as far as the figure 2, and the rod 35 as far as the figure 7, as above stated. The rods 35, 36, 37 serve as stops for the arms 25, 26, 27 which are held in contact with said stops by springs 83, 84, 85.

The shaft 29 is also provided with five studs 41, 42, 43, 44, 45 coming successively into contact with two plates or sectors 46, 47 (Fig. 3) which are suitably spaced apart and mounted on shaft 9, so that if said shaft 9 rotates alternately in one and the other direction, the plates 46, 47 will allow the studs 41, 42, 43, 44, 45 to pass in succession, as in the case of a clockwork escapement, thus allowing the shaft 29 drawn by spring 31 to move successively to the right (Fig. 1) together with the contact rods 35, 36, 37. The said plates 46, 47 also carry a rod 82 which is adapted to come into contact with the arms 25, 26, 27 when the shaft 9 turns in the direction of the arrow 87 (Fig. 3).

The shaft 9 carries an arm 48 which is normally held against a stop 50 by a spring 49. On the arm 48 is adapted to slide a cam of inclined plane shape, 51, so as to effect the oscillation of the shaft 9 and the escapement plates 46, 47 mounted thereon.

Figure 5:
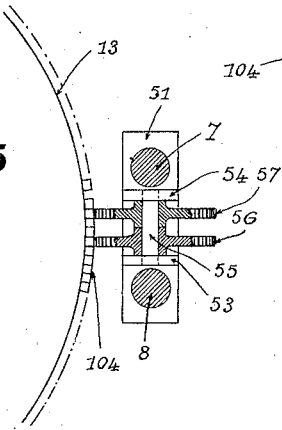
Fig. 5 is a sectional view of a detail on the line D—D of Fig. 1.

The cam 51 is secured to a carriage 52 guided by two cross pieces 7, 8; said carriage is thus enabled to slide parallel to said cross-pieces and parallel to the multiplying cylinders 13, 14, 15. The carriage 52 is provided with two lugs 53, 54 having mounted therein a small vertical shaft 55 (Fig. 5) on which are separately revoluble two gear wheels 56, 57 which are thus displaced along with the carriage and parallel to the generatrices of the multiplying cylinders. In this motion, the gear wheels 56, 57 engage two racks of the drums corresponding to a given product, for instance with the racks $h, h'$ of sector No. 6 (Fig. 4) of the drum 15.

The carriage 51 is also provided with two vertical stud shafts 58, 58ª having slidable and revoluble thereon a frame formed by the two horizonal cheeks 59, 59ª and a rod 77; said frame carries an axle 60 having thereon a totalizing counter 61 which may be of a known type and may comprise for example six drums, each provided with numbers from 0 to 9; on turning any one of said drums through 10 divisions, this will mark a unit on the next drum representing units of the next higher order; each drum turns under the action of the gear wheels 62, 63, 64, 65, 66, 67 secured respectively to each.

The axle 58ª carries five studs 68, 69, 70, 71, 72 and axle 58 carries a spring 73 constantly impelling the carriage 59 downwardly. The lower cheek 59ª of the frame 59 is provided with a notch 75 (Fig. 7) and carries a plate 74 notched at 76; said notches 75, 76 can allow the said studs to pass, but they are so spaced apart angularly that if the frame 59 is pivoted on the axles 58, 58ª, said frame pushed by the spring 73 will cause the studs to pass successively through the notches, in the same manner as for a clockwork escapement, and thus the frame 59 is given successive downward vertical movements so as to successively bring the gear wheels 62, 63, 64, 65, 66, 67 in pairs adjacent the gear wheels 56, 57.

The carriage 52 can be displaced as a whole by an alternate motion to the right and left along the two cross-pieces 7, 8 of the machine by means of a sleeve or handle 79 which is loosely revoluble and slidable on the rod 77. By drawing the sleeve 79 to the right (Fig. 1) the frame 59 will pivot at the same time on the axles 58, 58ª so that the wheels 62 to 67 of the totalizing counter will recede from the wheels 56, 57 and will remain disengaged therefrom during the entire right-hand stroke of the carriage. The wheels 56, 57 thus roll upon the racks of the multiplying cylinders without affecting the totalizing counter.

On the contrary, by drawing the handle 79 to the left, the frame 59 will pivot at the left on the axles 58, 58ª and two of the wheels 62 to 67, for instance 62, and 63, will engage the wheels 55, 57, and the corresponding recording drums of the counter will be rotated by wheels 56, 57 which are in turn actuated by reason of their rolling upon the racks of the multiplying cylinders 13, 14, 15.

During the first stroke of the carriage 52 along the multplying drums 13, 14, 15 towards the left (Fig. 1) the wheels 62, 63 engage 56, 57;. during the second stroke of the carriage, the wheels 63, 64 are engaged; on the third stroke, the wheels 64, 65, etc., since each forward and return stroke of the carriage produces an alternate rotation of the frame 59 so that it descends by the distance between two successive studs, for instance 68, 69, which distance will of course correspond to the distance between two successive gear wheels 62, 63.

The angle of rotation of the frame 59 is limited at the right and left, and for this purpose an axle 80 (Fig. 6) traverses the frame 59 parallel to the axis and makes contact at one end with the carriage 52 and at the other end with a stop-piece 81.

Moreover, at each movement of the carriage 52 to the right, the cam 51 raises the rod 48 thereby rotating the shaft 9 and the escapement plates 46, 47 in the direction of the arrow 87, (Fig. 3) and this rotation acts in the first place to separate the arms 25, 26, 27 from the contact rods 35, 36, 37—irrespectively of the positions of said rods corresponding to a chosen factor—and then to allow the shaft 29 to slide to the right, (Fig. 1) under the action of the spring 31, by a quantity equal to the space between two successive studs 41, 42, this space corresponding to the space between two arms such as 25, 26. This sliding of the shaft 29 to the right is permitted, as above stated, by the escapement plates 46, 47.

In this manner, at the outset of the operation, the arm 27 which corresponds to the drum 15, and hence to the figure 6 in the numeral example chosen ($327\times146$) is located, as shown in Fig. 1, opposite the contact rod 35 corresponding to the figure 7 of the multiplicand. After the next stroke of the carriage, the arm 27 will be in front of the contact rod 36, and arm 26 opposite the contact rod 35. After the third stroke, of the carriage, the arms 27, 26, 25 will be respectively opposite 37, 36, 35 and so on. It is observed that these mechanical movements correspond to the gradual displacements of the factor 146, in the inverted state, below the factor 327, according to the principle set forth at the outset of the present description.

The operation of the machine is as follows:

One of the two factors, for instance the number 146, is set out on the multiplying cylinders, by turning each cylinder in the direction of the arrow 86 (Fig. 2) until the sectors Nos. 1, 4, 6 of the cylinders 13, 14, 15 come opposite a fixed mark, in this motion, the arms 25, 26, 27 actuated by said cylinders will turn until the arm 27 strikes the contact rod 35, and the arms 25, 26 strike the shaft 29, and as the cylinders further rotate they release the small spring strips from the holes 19, 20, 21 and cause them to successively drop into the following holes until the desired sector of the cylinder comes opposite the fixed mark.

The second factor, for instance 327, is then set out upon the contact rods 35, 36, 37 as above stated. When this is done, and the two factors 146 and 327 are now permanently indicated on the machine, one seizes the handle 77 by the ring 79 and gives to the same, and hence to the carriage 52, five complete forward and return strokes. The product is thus inscribed on the drums of the totalizing counter, with the unit or first figure located at the bottom. In fact, by bringing the drum 15 into the position indicated, one has brought opposite the wheels 56, 57 the sector No. 6 whereof the racks $a$ to $j$ and $a'$ to $j'$ represent respectively the units and the tens of the products of 6 by all the numbers from 0 to 9. By setting the rod 35 at the number 7 one has thus moved the arm 27 and hence the drum 15, which is drawn by the spring 85, so as to engage the wheel 56 with the rack $h$, whereof the number of teeth (2) is equal to the number of units of the product 6 by 7, and to engage the wheel 57 with the rack $h'$ whereof the number of teeth (4) is equal to the number of tens (4) of this same product. On moving the carriage 52 to the left, the wheel 56 thus turns through two divisions and the wheel 57 through four divisions, so that the wheels 62, 63 of the totalizing counter will record 2 units and 4 tens, or 42. The last right hand figure (2) of the final product desired (47742) is at once recorded.

The arms 25, 26 corresponding to the drums 13, 14 have made contact with the rod 29, and the wheels 56, 57 will thus stand opposite a rack zero of the corresponding drum, so that they are not actuated. The positions of the zero points of the rods 35, 36, 37 should be so adjusted as to correspond to the contact between the arms 25, 26, 27 and the shaft 29.

During the return movement of the carriage 52 to the right, the totalizing device is disengaged, as above explained. At the end of this movement, the cam 51 of the carriage 52 will act as above shown in order to allow the shaft 29 to move to the right through the distance between two successive rods 35, 36, 37 whereby the elements 26 and 35 and 27, 36 are respectively brought opposite each other. The drums 14, 15 thus assume the desired angular positions in order to enable the wheels 56, 57 to record on the totalizing counter the product 28, by rolling along the racks of the drum 14 and the product 12, by rolling along the racks of the drum 15. At the outset of the second movement to the left, the totalizing counter is again engaged with the wheels 56, 57 and since this double movement of release and engagement will, as already observed, cause the same to descend through the space of one drum or wheel of the totalizing counter, the drums 63, 64 will now engage the wheels 56, 57. During this second movement, said drums 63, 64 will thus act to record 120 units and 280 units, and at the end of this stroke the totalizing counter records the first two numbers 2 and 4 of the final product (47742) beginning at the right.

In like manner, the third forward and return stroke of the carriage gives the third figure of the product, and this latter will be complete at the fifth forward and return stroke, since the said machine will effect the multiplication of two numbers of three figures. It is understood that the numbers carried over, should such exist, are automatically transferred by the totalizing counter.

It is clear that if the factors which are set out have less than three figures, one can nevertheless continue to give to the carriage the five complete forward and return movements, and some of these movements will only record sums of partial products all of which are null; so that a machine of given multiplying capacity is susceptible of performing any multiplication as set out upon the same, by giving the same number of strokes to the carriage in all cases.

Use can also be made of different numbers of figures in the two factors, employing machines having for example three multiplying cylinders and five rods 35, 36, 37, etc., and capable of giving the products of numbers of three figures by numbers of five figures; obviously, in this case, the number of strokes will be seven, and there will be seven successive positions of the shaft 29. By providing one or two additional positions of escapement for said shaft, one may bring all the multiplying cylinders to the zero point either at the outset or at the end of the operation, or both, irrespectively of the factor indicated on the rods 35, 36, 37 so that in this position, all the stop-pieces 25, 26, 27 will bear upon the shaft 29 outside of the rods 35, 36, 37. This arrangement may be useful in order to facilitate the marking or the reading of the factors.

To return the machine to zero, the cylinders 13, 14, 15 and rods 35, 36, 37 are brought directly to zero; the totalizing counter is returned to zero by the special zero return device pertaining to the same; the shaft 29 is brought to the starting position by turning shaft 9 in the direction of the arrow 87, for example by means of a handle secured to the same, so that the plates 46, 47 entirely disengage the studs 41, 42, 43, 44, 45 and the shaft 29 is then pushed to the left to the extreme starting position.

The frame 59 is returned to the starting position by removing the contact pin 80 and turning said frame so that the plate 74 shall be entirely clear from the studs 68, 69, 70, 71, 72. The frame 59 is then pushed up to its extreme starting position. It may also be raised by the hand by giving it successive oscillations to right and left so as to perform upwardly the successive escapement movements in order to reach the starting position.

The machine has an advantage in being enabled to inscribe each figure of the product directly and in a single operation, so that it is operated in a very easy manner.

Since thirteen is the maximum sum of the first right-hand figure and of the last left-hand figure of any product the length of each product-indicating cylinder 13, 14, 15 can be reduced to a minimum by giving it a length corresponding to thirteen rack teeth, while at the same time maintaining the great advantage that the two intermediate gear wheels 56, 57 shall never be actuated at the same time, and this enables the use of known totalizing counters wherein only one drum can be operated at a time in order to carry over the tens figure in a correct manner.

Figure 8:
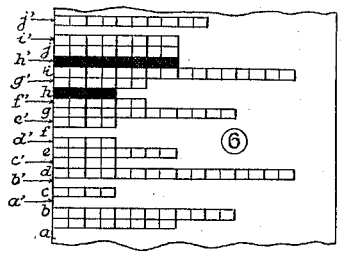
Fig. 8 is a partial diagrammatic development of the periphery of one of the drums in a modified form.

If on the contrary use is made of known totalizing machines wherein the tens are carried over correctly even though two drums are operated at a time, no drawback will occur if two racks representing tens and units of a given product are made to coincide, and one can further reduce the height of the cylinder and even arrange the racks for units and tens so that they will begin at the same base of this cylinder, as shown in Fig. 8 for the sector 6.

According to the number of teeth of the wheels 56, 57 which are engaged at the same time with the corresponding racks, said wheels will rotate, when entering or leaving the racks, by additional teeth or fractions thereof. To compensate any errors due to this cause and to effect this desired rotation of the wheels 56, 57, it is necessary when said wheels have several teeth engaged at a time with the racks, to remove one or more teeth from said racks according to the case or to reduce the height of the end teeth of the racks.

Obviously, the invention is not limited to the hereinbefore described details of construction which are given solely by way of example. For instance, each cylinder for indicating products 13, 14, 15 might be formed of two separate cylinders whereof one carries the left-hand racks $a$—$j$ and the other the right-hand racks $a'$—$j'$. The drive of the carriage 52 can also be modified. All the different operations for the return to zero can be automatically effected by any suitable means, even automatic, and in particular similar to means used for the return of the carriages of typewriting machines which are enabled to return by a single stroke whilst they advance by steps corresponding to letters.

In like manner, a factor can be set out upon the rods 35, 36, 37 by means of buttons controlling said rods by racks, tappets, cams or the like, or even by means of drives which are brought to the outside of the apparatus, and similar devices can also be used for setting out the other factor upon the multiplying cylinders. The number of teeth in each rack, instead of being equal to the figure which it represents, may be equal to a multiple of this figure. The space between two racks such as $h$, $h'$ representing the right-hand and the left-hand figures of a given product, and which have been supposed to be equal to the width of two racks, may be equal to the width of any even number of racks.

The said machine can be used for all other operations depending upon multiplication, by the known methods employed for the purpose in other multiplying machines. Printing of the result can be effected with the machine in a very simple manner. At the right hand end of the machine is mounted a reel upon which a paper strip is caused to travel. When at the right-hand end of the stroke, this strip is printed upon by the record drum which has just recorded the units of the sum of the partial products giving the figure of any row of the product. If the reel is caused by any desired means to turn through a fraction of a revolution so as to move forward the paper at each forward and return stroke of the carriage, and if the record drums are provided with suitable type, at each end of the right-hand stroke of the carriage one of the figures of the product definitely furnished by the machine at each stroke of the carriage will be printed upon the paper.

Having now described my invention, what I claim as new and desire to secure by Letters Patent is:

1. A calculating machine comprising in combination means for inscribing a first factor, elements connected with said means for representing the successive terms of this first factor inverted, means for inscribing a second factor, elements connected with said means for representing the successive terms of this second factor in normal order, means for successively bringing each element representing the terms of the first factor inverted into contact with each of the elements representing the terms of the second factor, calculating means for obtaining the product of two terms when the elements representing the same are in contact, a totalizer, and means connected with said calculating means and adapted to register upon said totalizer, and according to its order, the sum of these products of two terms for each of the successive positions of the elements representing the terms of the first factor inverted relative to the elements representing the second factor.

2. A calculating machine comprising in combination means for inscribing a first factor, elements connected with said means for representing the successive terms of this first factor inverted, means for inscribing a second factor, elements connected with said means for representing the successive terms of this second factor in normal order, means for successively bringing each element representing the terms of the first factor inverted into contact with each of the elements representing the terms of the second factor, revoluble cylinders of equal size in coaxial position, each of the said cylinders carrying two-hundred equidistant racks disposed according to generatrices, one hunderd of the said racks having a number of teeth equal to $n$ times the units figure of the successive products of the numbers from 0 to 9 by the numbers from 0 to 9, and the remaining one-hundred racks having a number of teeth equal to $n$ times the tens figures of the successive products of the numbers from 0 to 9 by the numbers from 0 to 9, means for connecting said cylinders on the one hand to the elements representing the first factor inverted, and on the other hand to the elements representing the second factor, two gear wheels adapted to respectively cooperate with the two racks corresponding to any given product of two numbers from 0 to 9, a totalizing counter, said gear wheels being adapted to actuate the said counter, and means for successively engaging said wheels with the successive drums of the totalizing counter.

3. In the combination as claimed in claim 2, the further characteristic feature consisting in that the rack representing the units of a product of a number from 0 to 9 by a number from 0 to 9 is separated from the rack representing the tens of said product by a whole number of spaces between two successive racks, this interval being the same for all these different products, and equal to the space between the two toothed wheels.

4. In the combination as claimed in claim 2, the further characteristic feature which consists in that the first hundred racks of each cylinder commence at one end of the cylinder whilst the other hundred racks commence at the other end of the cylinder, the height of the cylinder being equal to $13n$ times the pitch value of a rack.

5. A calculating machine comprising in combination, equal-sized revoluble cylinders in coaxial position, said cylinders corresponding respectively to the different figures of the first factor, each cylinder being provided with an intermediate element and adapted to occupy ten different positions relative to said element, the relative positions of said intermediate elements being the inverse of the relative positions of the cylinders, means for connecting each cylinder with its intermediate element in each of the said positions, stop members each adapted to occupy ten different positions and respectively corresponding to the figures of the second factor, said stop members being adapted to contact with said intermediate elements for actuating said cylinders, means for bringing successively each of the said intermediate elements into contact with each of said stop members, each cylinder being provided with two-hundred equidistant racks disposed according to generatrices, one-hundred of said racks having a number of teeth equal to $n$ times the units figure of the successive products of the numbers from 0 to 9 by the numbers from 0 to 9, and the remaining one-hundred racks having a number of teeth equal to $n$ times the tens figure of the successive products of the numbers from 0 to 9 by the numbers from 0 to 9, two gear wheels cooperating respectively with the two racks which correspond to a given product of two numbers from 0 to 9, a totalizing counter, said gear wheels being adapted to actuate the said counter, and means for effecting the successive engagement of said wheels with the successive drums of the totalizing counter.

6. In the combination as claimed in claim 5, the further characteristic feature which consists in that the cylinders are respectively connected by spring-controlled arms to concentric tubes whereupon are mounted radial arms in the inverse order to that of the cylinders and which constitute the intermediate elements.

7. In the combination as claimed in claim 5, the further characteristic feature which consists in that the totalizing counter is mounted on a carriage slidable along all the cylinders, means for engaging said totalizing counter with the said racks during the stroke in one direction, and means for disengaging the totalizing counter from the racks during the stroke in the other direction.

8. A calculating machine comprising in combination, equal-sized revoluble cylinders in coaxial position, said cylinders corresponding respectively to the different figures of the first factor, each cylinder being provided with an intermediate element and adapted to occupy ten different positions relative to said element, the relative positions of said intermediate elements being the inverse of the relative positions of the cylinders, means for connecting each cylinder with its intermediate element in each of the said positions, stop members each adapted to occupy ten different positions and respectively corresponding to the figures of the second factor, said stop members being mounted on a support which is slidable under the action of a spring, each cylinder carrying two-hundred equidistant racks disposed according to generatrices, one-hundred of the said racks having a number of teeth equal to $n$ times the units figure of the successive products of the numbers from 0 to 9 by the numbers from 0 to 9, and the remaining one-hundred racks having a number of teeth equal to $n$ times the tens figure of the successive products of the numbers from 0 to 9 by the numbers from 0 to 9, two gear wheels cooperating respectively with the two racks which correspond to any given product of two numbers from 0 to 9, a totalizing counter mounted on a carriage which is slidable along all the cylinders, means for engaging said totalizing counter with the racks during the stroke in one direction along the cylinders means for disengaging the totalizing counter from the racks during the stroke in the opposite direction, and escapement means providing for the displacement of the slidable member which carries the said stop members, said escapement means being actuated by the carriage of the totalizing counter at the end of the forward stroke of the latter.

9. In the combination as claimed in claim 8, the further characteristic feature which consists in that disengaging elements for releasing the intermediate elements from the stop members are actuated at the end of the forward stroke of the totalizing counter before the escapement action of the slidable member carrying the stop members takes place.

10. In the combination as claimed in claim 8, the further characteristic feature which consists in that the drums of the totalizing counter are mounted on a frame adapted to pivot on the carriage which is slidable along the cylinders, this pivoting movement controlling an escapement device whereby the totalizing counter is enabled to move parallel to its axis through a distance equal to the spacing between two adjacent totalizing drums.

In testimony whereof I have signed my name to this specification.

AUGUSTIN SEGUIN.